United States Patent

[11] 3,593,322

[72] Inventor David Joseph Morris
Holon, Israel
[21] Appl. No. 728,380
[22] Filed Apr. 23, 1968
[45] Patented July 13, 1971
[73] Assignee English Electric Computers Limited
London, England
[32] Priority May 2, 1967
[33] Great Britain
[31] 20182/67

[54] SEQUENTIAL ADDRESS MAGNETIC MEMORY SYSTEM

4 Claims, 5 Drawing Figs.

[52] U.S. Cl. .......... 340/174 M,
340/174 A, 340/174 NC
[51] Int. Cl. .......... G11c 5/08,
G11c 7/02, G11c 5/02
[50] Field of Search .......... 340/174 M,
174 LC, 149, 174 R

[56] References Cited

UNITED STATES PATENTS

| | | | |
|---|---|---|---|
| 2,800,643 | 7/1957 | Mestre | 340/174 |
| 2,993,196 | 7/1961 | Hughes et al. | 340/174 |
| 3,069,658 | 12/1962 | Kramskoy | 340/174 |
| 3,215,992 | 11/1965 | Schallerer | 340/174 |

*Primary Examiner*—Bernard Konick
*Assistant Examiner*—Steven B. Pokotilow
*Attorney*—Misegades & Douglas

ABSTRACT: This invention relates to a magnetic core store with coincident current selection. In such a store, the readout of successive words in sequential addresses involves the selection of each word in turn. By the present invention, such successive reading out of words in a block is achieved by energizing that selection line which is common to the block continuously, and pulse energizing the other selection lines in succession. Thus, for the first word, noise is produced on the sense lines by both selection lines, but for the remaining words the only noise is that due to the selection lines individual to the successive words being read out. Preferably, the store is arranged so that this latter noise is small compared with the noise produced on normal full selection of a word. A more rapid readout of the block is thereby achieved.

A SEQUENTIAL ADDRESS MAGNETIC MEMORY SYSTEM

The present invention relates to magnetic core memory systems.

More specifically, a magnetic core memory system is known in which there is a memory array of $p \cdot q$ magnetic elements, including first and second sets of $p$ and $q$ drive lines respectively, each of the $p \cdot q$ magnetic elements being coupled to a different pair of drive lines one from each set, and any selected pair of drive lines one from each set being energizable so as to switch the magnetic element coupled to that pair of lines, and in which, in operation, reading is performed by energizing the two selected drive lines with half-select read currents of which that on the selected drive line from the first set rises before that on the selected drive line from the second set.

Preferably, the memory system comprises a plurality of similar memory arrays each as just defined and having corresponding drive lines connected in series. Preferably also the cores are arranged in a plurality of similar planes; each drive line of one set of drive lines is arranged as a set of serially connected lines in corresponding positions one from each plane; a further plurality of lines in each plane is arranged to run transversely thereto and corresponding ones of which in different planes are serially connected to form the sense-inhibit lines; and each drive line of the other set of drive lines is arranged as a set of serially connected lines in a single plane running parallel to the sense-inhibit lines. The rises of the read currents are staggered so as to minimize noise problem during reading.

In certain applications, it is necessary to read out rapidly a block of information comprising a block of words stored in adjacent storage locations in the memory, leaving those storage locations empty. This can be done by using only read cycles, instead of the usual read/write cycles, thereby achieving a higher speed. However, this increase of speed may still result in an undesirably low speed of operation, and the object of the present invention is to provide a memory system of the above type in which the speed of block readout is increased still further.

Thus, according to the present invention, there is provided a system as defined above and wherein, for reading out a block of information, the half select read current on the selected drive line from the first set is maintained steady while drive lines from the second set are successively energized with half select read currents.

Two embodiments of the invention will now be described, by way of example, with reference to the accompanying drawings, in which.

Figure 1:
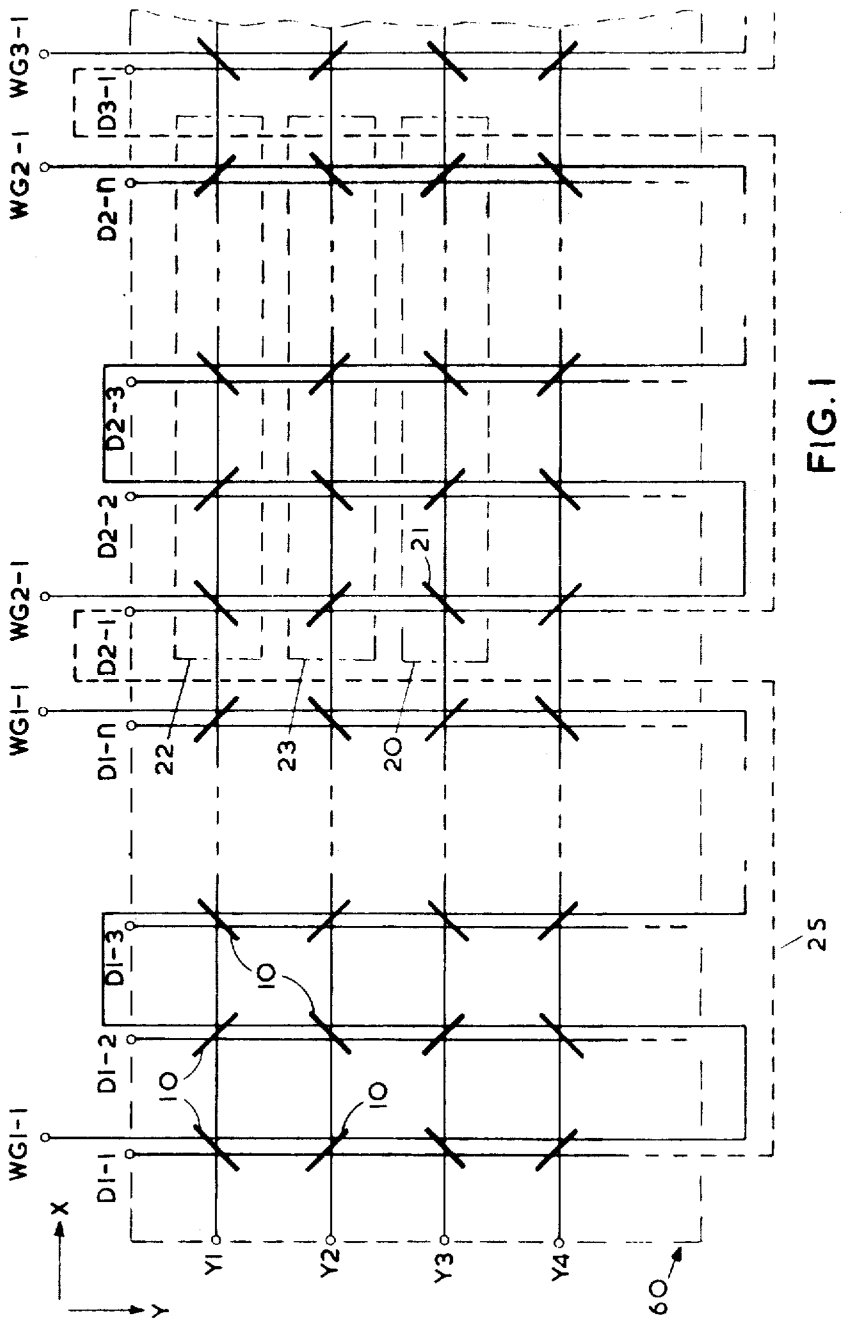
FIG. 1 is a partial view of a two-dimensional matrix or plane.

FIG. 1 is a partial view of a plane 60 of magnetic elements 10, e.g. toroidal cores. The two coordinates of the plane are termed the X and Y coordinates, running horizontally and vertically respectively. Along each Y-line, i.e. horizontal row, there is a total of $x$ elements, and along each X-line i.e. vertical column, there is a total of $y$ elements.

A separate Y line is threaded through each row of $x$ elements, lines Y1, Y2, Y3 and Y4 being shown, and there being $y$ such lines. Two separate column lines are threaded through each column of elements. The columns are arranged in groups of $n$ lines, each group having a respective word group line threaded through all elements in the group, word group lines WG1–1, WG2–1 and WG3–1 being shown. The second column line, termed a digit line, threads each column of elements parallel to the word group line, lines D1–1, D1–2, D1–3 D1–$n$, D2–1, etc. being shown. The number $n$ is a factor of $x$, and there are therefore $x/n$ word group lines in the plane each coupled to $ny$ elements, and $x$ separate digit lines each coupled to $y$ elements.

Each of the word group lines and Y lines is coupled, via respective switches and selection matrices, to current drivers (not shown) which can produce a half-select current of either polarity. Corresponding ones of the digit lines in the different word groups are coupled together, e.g. by connections 25 as shown for digit lines D1–1, D2–1 and D3–1, so as to form $n$ sets of coupled digit lines, and each set of digit lines is coupled to a respective sense-inhibit unit. This unit is used to sense information during reading, and to produce half-select currents of a single polarity during writing.

Figure 2:
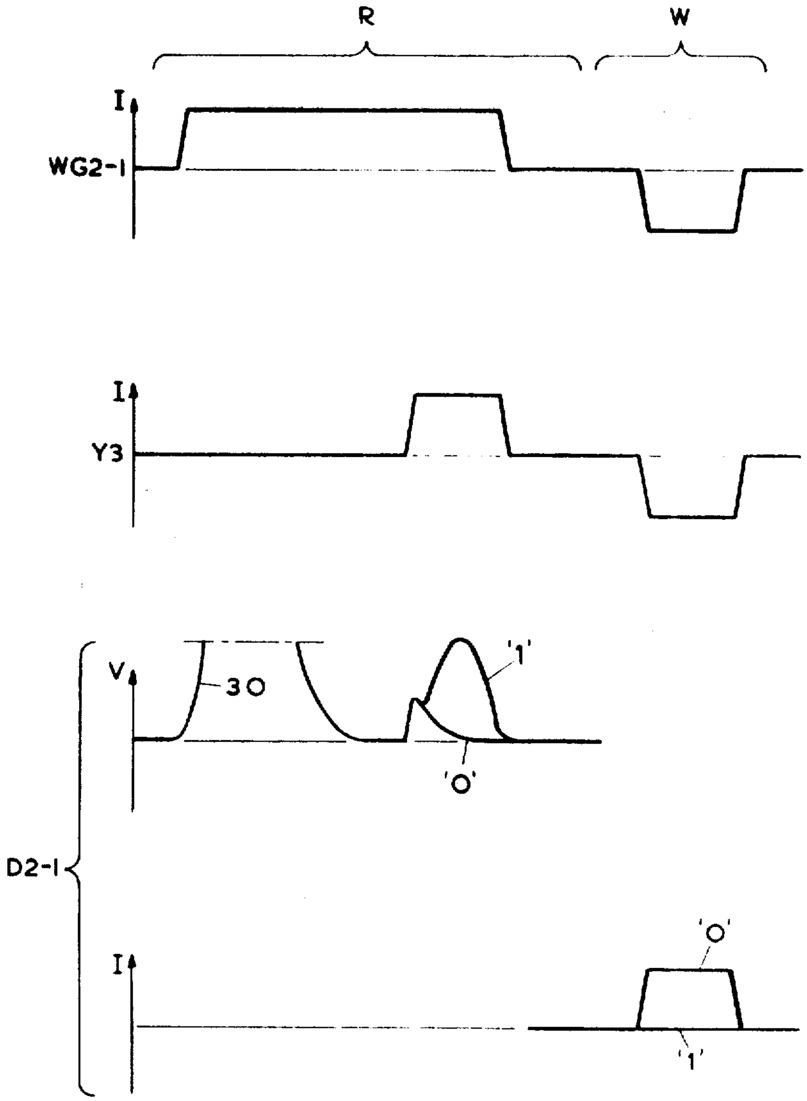
FIG. 2 is a set of waveforms relating to the operation of core 21 of word 20 of the matrix of FIG. 1.

In operation $x/n$ words each of $n$ bits are stored the the elements of each Y-line, each word being stored by the $n$ elements to which a single word group line is coupled. Thus the elements common to the lines WG2–1 and Y3, shown enclosed in the rectangle 20, store a single word, and the manner in which this word is read and written will be explained with reference to the waveforms of FIG. 2.

For reading (period R, FIG. 2), the word group line WG2–1 is first energized with a half-select current, thus half-selecting all elements to which it is coupled. Since the digit lines D2–1 to D2–$n$ are coupled to all elements in their respective columns in the same direction as the line WG2–1, this results in a large noise pulse 30 being induced on line D2–1 (which is the only digit line whose waveforms are illustrated), and of course on the other digit lines D2–2 to D2–$n$ as well. After this noise pulse 30 has died away, a second half-select current is also applied on line Y3, thereby selecting the word 20 to be read. The combination of the two half-select currents through the elements in the rectangle 20 switches them all to the "0" state. Those which were originally in the "1" state will therefore induce signal output pulses on the digit lines to which they are coupled, while those which were originally in the "0" state will be substantially unaffected and will induce only small noise output pulses on the digit lines to which they are coupled. (The signal output obtained when reading a "1" is substantially greater than the noise output obtained when reading an "O," but may be very considerably less than the noise pulse 30.) The pulse produced at the read time on the digit line D2–1 will therefore be as indicated by the "0" or "1" voltage waveforms, FIG. 2, according as "0" or "1" was stored in the element 21 (which is one of the elements 10). The sense circuits to which the sets of digit lines are coupled are rendered effective at this time, and produce outputs together indicative of the stored word.

For writing (period W, FIG. 2), the half-select currents on the lines WG2–1 and Y3 are reversed, thus tending to switch all elements in the rectangle 20 to the "1" state. If a "1" is to be written in an element, this switching is allowed to occur; if, however, a "0" is to be written, this switching is inhibited by energizing an inhibit driver coupled to the relevant set of digit lines and thereby energizing the relevant digit line with a half-select current which opposes the half-select currents on the lines WG2–1 and Y3. Thus the current applied to the digit line D2–1 is of the form "0" or "1," respectively shown on the lowermost waveform of FIG. 2, according as a "1" is to be written in the element 21.

The system described above therefore comprises a memory with a total capacity of $xy/n$ words, each of $n$ bits, and each word of which can be read and written with all bits in parallel. The overall system organization is similar to that shown in FIG. 3 for the second embodiment.

Figure 2A:
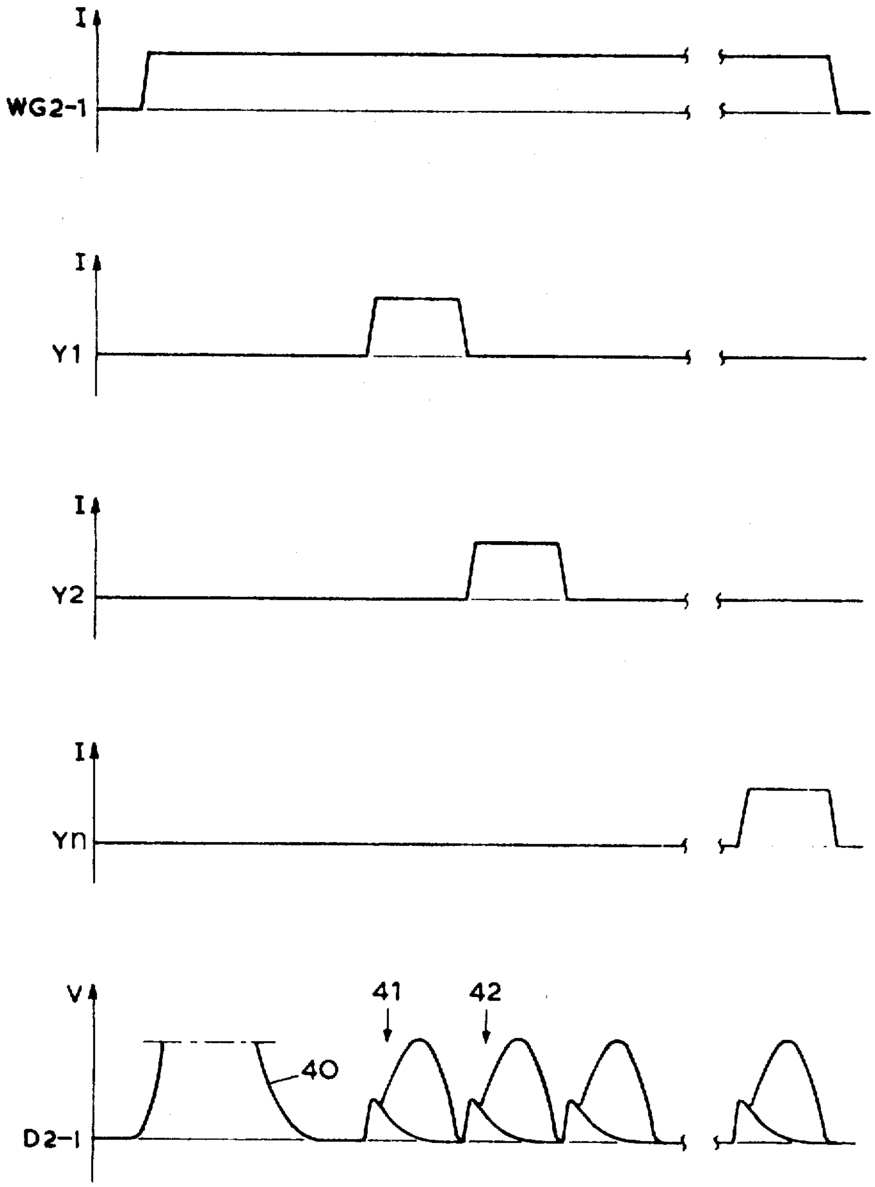
FIG. 2A is a set of waveforms relating to block readout in the matrix of FIG. 1.

With reference now to FIG. 2A, the operation of block readout will now be described. The process starts with the rise of a half-select read pulse on a word group line, e.g. line WG2–1. This induces a large noise pulse 40 on the digit line D2–1. The next step is the application of a half-select read pulse line Y1, thereby reading out the word in rectangle 22 (FIG. 1), the sense pulse 41 on line D2–1 being simultaneous with the read pulse. Immediately following the end of the read pulse on line Y1, a half-select read pulse is applied on line Y2, thus reading out the word in rectangle 23, the sense pulse 42 on line D2–1 being simultaneous with the read pulse. The reading out of this word is followed by the energization of the next Y line (Y3), and so on up to the last Y line (Y*n*). The word group line WG2–1 is maintained energized throughout the successive energization of the Y lines.

It will therefore be appreciated that in the block readout operation, a complete block of words stored on all adjacent Y lines in any selected word group can be read out. In normal readout (FIG. 2), the time taken consists of two periods, firstly the rise of the word group line current and the dissipation of the noise pulse 30, and secondly the rise of the Y line current and the production of the desired sense signal. The first period is typically three or four times the length of the second, the memory being designed so that the major part of the noise is induced during the first period. It is thus evident that the block read out operation requires this first period only once, at the beginning of the operation instead of requiring it for every word read out. That is, the word group noise is produced only once for the whole read out operation. Block read out therefore results in an overall speed increase of three or four times the speed which normal repeated read out would permit.

A three-dimensional system will now be described with reference to FIGS. 3 and 4, in which the core array consists of N planes each of $x$ by $y$ elements. The number of words which can be stored is therefore $Nxy/n$. In the system described, $N$=16, $x$=512, and $y$=2048, so that approximately half a million words each of 32 bits can be stored.

Figure 4:
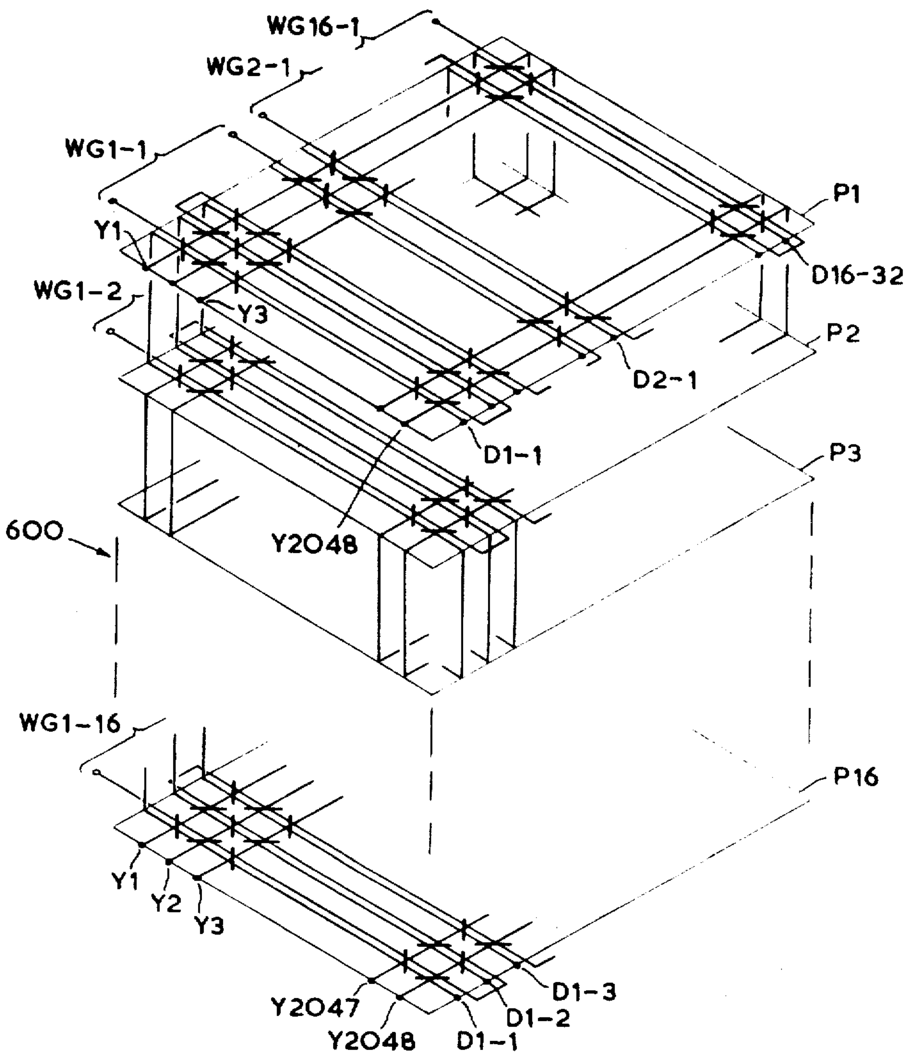
FIG. 4 is a partial view of the three-dimensional array of the system of FIG. 3.

Referring first to FIG. 4, a plurality of planes P1, P2, P3, P16 are arranged in a stack 600. Corresponding Y lines and digit lines of the planes are interconnected as indicated in the drawing so as to form a composite set of Y lines Y1 to Y2048 and digit lines D1–1 to D16–32, each of which is coupled to 16 corresponding rows or columns of elements, one in each plane. Each plane has 16 independent word group lines, making a total of 256 word group lines (WG1–1 to WG16–16) in all.

Figure 3:
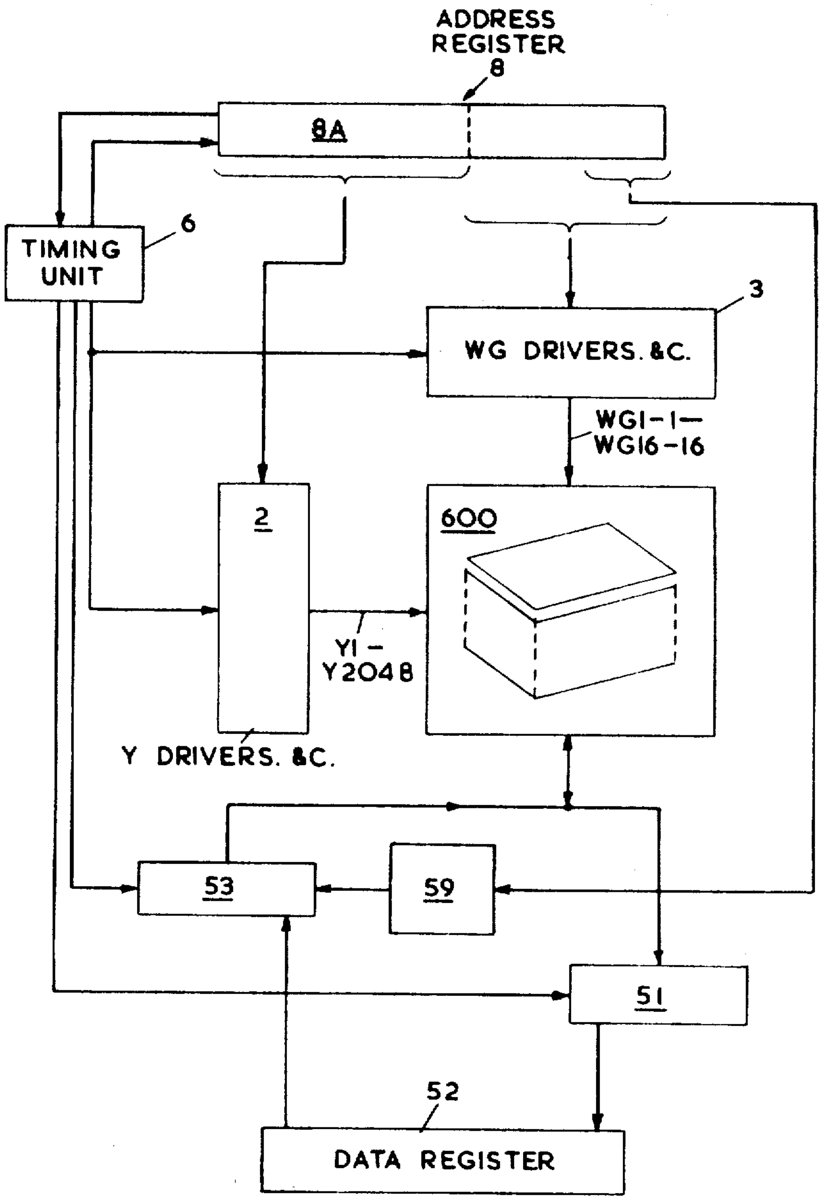
FIG. 3 is a block diagram of a system including a three-dimensional array.

Referring now to the block diagram of FIG. 3, a 19-bit address register 8 has the outputs of 11 stages fed to a decoding circuit and set of Y drivers, switches and selection matrices 2, and has the outputs of the remaining eight stages fed to a decoding circuit and set of word group drivers, switches and selection matrices 3, A timing unit 6 also feeds the blocks 2 and 3, which in turn feed the stack 600, being connected to the pairs of terminals Y1 and Y1, Y2 and Y2 etc. up to Y2048 and WG1–1, WG2–1, etc. up to WG16–16. One drive line each from the two blocks 2 and 3 is selected by the address register 8, thereby selecting a single word in the stack 600, and the timing unit 6 provides timing signals to the blocks 2 and 3 to cause the selected drive lines to be energized with the current waveforms shown in FIG. 2.

In the stack 600 FIGS. 3 and 4), there are 16 digit windings for each bit, referenced D1–1 to D16–1 for the first bit, etc. These windings are all coupled together through appropriate transformers which feed preamplifiers and amplifiers forming a set of sense amplifiers 51. The digit windings are also fed from 32 inhibit drivers 53, each of these inhibit drivers having eight outputs feeding respective pairs of the 16 digit lines to which it is coupled. A selection circuit 59, fed from the end three stages of the address register 8, gates the output of each inhibit driver into the appropriate one of the eight pairs of digit lines to which it is coupled. The sense amplifiers 51 and inhibit drivers 53 are coupled as shown to a 32-bit data register 52 which is used for temporary storage of a word being written or read.

Since the system operates with words of 32 bits, substantially the whole of this circuitry will consist of 32 separate sets of circuits. In FIG. 3, each of the blocks 51 to 53 represents the 32 sets of circuits.

In order to permit the operation of block readout to be performed, the address register 8 has its lowermost elevent stages 8A (shown at the left-hand end in FIG. 3) constructed as a counter. For block readout the address register 8 has the address of the first word of the block initially stored therein (the block being stored in the 2048 addresses of a single word group). The timing unit 6 is connected to the address register counter portion 8A. During block readout the timing unit 6 emits a pulse to address register portion 8A after a word has been read out, thereby causing the address register to count up by one and thus select the next word. The next word is then read out, the timing and waveforms therefore being substantially as illustrated in FIG. 2A. When the count in the counter portion 8A reaches its maximum, indicating the end of the block, this is fed back to the timing unit 6 to terminate the block readout operation.

Of course, the arrangement can be modified by the addition of further circuitry to permit the rapid readout of only parts of complete blocks if desired.

I claim:

1. Magnetic information storage apparatus including a primary group of magnetic storage elements each switchable between opposite stable magnetic states by energization of driving lines linked therewith, the primary group being subdivided into a plurality of secondary groups respectively each having corresponding significance, each secondary group including a plurality of individual elements, the individual elements of the different secondary groups having corresponding significances respectively; a first driving line linked with all the elements of the primary group; a plurality of second driving lines, a different one for each of the secondary groups respectively, each linked with all the elements of the secondary group; means for reading stored information from the elements including first means for energizing with a half-select current said first driving line and second means for energizing said second driving lines with a half-select drive current individually and temporarily in turn in a predetermined sequence, said first energizing means being arranged to maintain the energization of said first driving line throughout said sequence of energization of said second driving lines; and further windings respectively each separately linked with corresponding elements of all the secondary groups, output signals being induced into said further windings by switching of those elements linked therewith.

2. Magnetic information storage apparatus including an array of magnetic storage elements arranged in a plurality of primary groups as set forth in claim 1, the primary groups each containing secondary groups of corresponding significance respectively, including a plurality of first drawing lines respectively each linked with all the elements of a different single one of the primary groups; the second driving lines each respectively being linked with corresponding secondary groups of all the primary groups, and in which the reading means also includes means for selecting one of said first driving lines to be energized.

3. Magnetic information storage apparatus as claimed in claim 1 including a plurality of further windings for each of the primary groups, each of said further windings being linked only with elements of a single primary group.

4. Magnetic information storage apparatus as claimed in claim 3 in which said further windings of all the primary groups are respectively connected in series, whereby each of said further windings respectively is linked with corresponding elements of all the primary groups.